Aug. 14, 1928.
C. USCHMANN
1,681,070
ADJUSTABLE SUPPORT OR EASEL
Filed Jan. 18, 1927
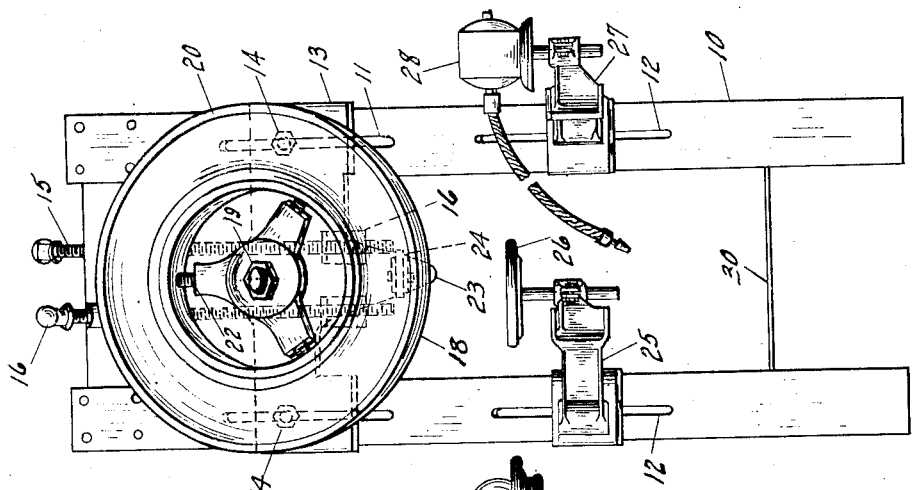
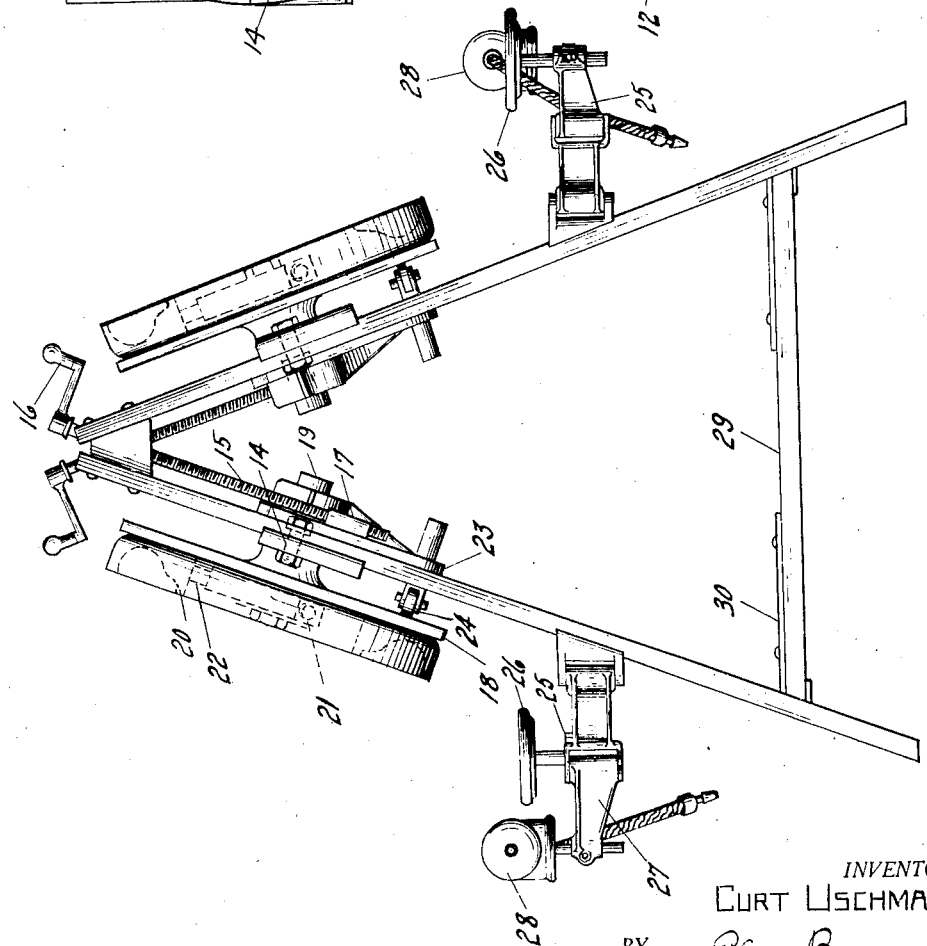
INVENTOR.
CURT USCHMANN
BY
ATTORNEYS Patented Aug. 14, 1928.

1,681,070

UNITED STATES PATENT OFFICE.

CURT USCHMANN, OF AKRON, OHIO, ASSIGNOR TO THE FIRESTONE TIRE AND RUBBER COMPANY, OF AKRON, OHIO, A CORPORATION OF OHIO.

ADJUSTABLE SUPPORT OR EASEL.

Application filed January 18, 1927. Serial No. 161,846.

This invention relates to supports or easels, and particularly to adjustable supporting stands adapted for use in rotatably mounting tire molds or other annular objects during the hand finishing and polishing operations incidental to the manufacture thereof.

One object of the invention is to provide a work-carrying support or easel which will permit the workman to carry out his operations conveniently in a standing or sitting position. Another object is to provide rotatable and vertically adjustable work-carrying means. A further object is to provide an additional support for said work-carrying means directly back of the point of operation on the work carried thereby.

The foregoing and other objects are obtained by the device illustrated in the accompanying drawings and described below. It is to be understood that the device is not limited to the specific form thereof disclosed herein.

Of the accompanying drawings:

Figure 1 is a side elevation of a support embodying the principles of the invention, a tire mold being supported thereon; and Figure 2 is a front elevation thereof.

Referring more particularly to the drawings, 10 represents a frame, each leg of which is provided with upper and lower slots 11 and 12 respectively, and having mounted thereon for vertical adjustment a cross arm 13 slidably attached to the frame by bolts 14 passing through slots 11. A screw-threaded shaft 15, actuated by crank 16, is journaled in the top of frame 10 and is threaded into a sleeve 17 attached to cross arm 13 for the purpose of vertically adjusting the latter. Work supporting table 18 is mounted on cross arm 13 by a stud shaft 19 attached to the table and journaled in the cross arm, and is freely rotatable, whereby the workman may turn the table by hand from time to time while working on the article supported thereby. When an annular article is to be supported on the table, as, for instance, the tire mold 20 illustrated, a spider 21 may be attached to shaft 19 and provided with set screws 22 in the ends of the arms thereof for tightening against the inner periphery of said annular article to center the latter on the work supporting table. In order to give added support to the lowermost portion of the table directly back of the point where the workman scrapes and polishes the engraved portions of the tire mold or other article, an extension 23 on cross arm 13 has mounted thereon a roller 24 engaging the back of table 18. Hinged bracket 25 carrying a seat or stool 26 may be mounted on one side of frame 10 while a similar hinged bracket 27 carrying a polishing motor 28 may be attached on the other side, vertical adjustment being had through attaching means passing through slots 12 in frame 10. In order to save factory space and bracing material, a pair of the supports above described are preferably attached back to back as illustrated in the drawings, the legs of the frame being inclined to come together at the top thereof and spaced apart at the bottom. A brace 29 for the lower portion of the frame, also serves to support a foot rest 30.

Modifications of the invention may be resorted to without departing from the spirit thereof or the scope of the appended claims.

What is claimed is:

1. A supporting stand comprising, a frame, a cross arm slidably mounted thereon, means for vertically adjusting the cross arm, a work table revolvably mounted on the cross arm, a roller attached to the cross arm and engaging the back of the work table to give added support thereto, and a spider attached to said table for centering annular objects thereon.

2. A supporting stand comprising a frame, a cross arm slidably mounted thereon, means for vertically adjusting the cross arm, a work table revolvably mounted on the cross arm, and means engaging the back of the work table to give added support thereto.

CURT USCHMANN.